(12) United States Patent
Jain

(10) Patent No.: US 8,282,037 B2
(45) Date of Patent: Oct. 9, 2012

(54) NACELLE FLOW ASSEMBLY

(75) Inventor: Ashok K. Jain, Tempe, AZ (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 12/894,505

(22) Filed: Sep. 30, 2010

(65) Prior Publication Data
US 2011/0020105 A1 Jan. 27, 2011

Related U.S. Application Data

(62) Division of application No. 11/938,975, filed on Nov. 13, 2007.

(51) Int. Cl.
*B64D 33/02* (2006.01)
*B64C 21/04* (2006.01)
*B64C 21/06* (2006.01)

(52) U.S. Cl. .................. 244/53 B; 244/207; 244/208

(58) Field of Classification Search .................. 244/204, 244/207–209, 53 B, 134 R, 134 B, 134 C, 244/1 N; 60/226.1, 262, 265, 266
See application file for complete search history.

(56) References Cited

U.S. PATENT DOCUMENTS

| | | | |
|---|---|---|---|
| 2,915,262 A | 12/1959 | Klein | |
| 2,948,111 A | 8/1960 | Nelson | |
| 2,984,111 A | 8/1960 | Nelson | |
| 3,059,878 A | 10/1962 | Kerry et al. | |
| 3,074,232 A | 1/1963 | Soyer | |
| 3,119,581 A | 1/1964 | Trevaskis | |
| 3,222,863 A | 12/1965 | Klees et al. | |
| 3,298,637 A | 1/1967 | Lee | |
| 3,422,624 A | 1/1969 | Brooks et al. | |
| 3,524,611 A | 8/1970 | Frank | |
| 3,532,100 A | 10/1970 | Hilton et al. | |
| 3,541,794 A | 11/1970 | Johnston et al. | |
| 3,568,694 A | 3/1971 | Johnson | |
| 3,575,259 A | 4/1971 | Wilkinson | |
| 3,583,417 A | 6/1971 | Clark et al. | |
| 3,611,724 A | 10/1971 | Kutney | |
| 3,618,699 A | 11/1971 | Evans et al. | |
| 3,623,328 A | 11/1971 | Pike | |

(Continued)

FOREIGN PATENT DOCUMENTS
EP 0516468 12/1992
(Continued)

OTHER PUBLICATIONS

U.S. Appl. No. 11/595,040, filed Nov. 10, 2006, Winter, et al., entitled "Gas Turbine Engine Providing Simulated Boundary Layer Thickness Increase".

(Continued)

*Primary Examiner* — Joseph W Sanderson
(74) *Attorney, Agent, or Firm* — Carlson, Gaskey & Olds, P.C.

(57) ABSTRACT

A nacelle assembly for a turbine engine has a cowl for a turbine engine. The cowl has a first surface spaced from a second surface. The second surface defines defining a bypass flow passage. A flow volume is spaced between the first surface and the second surface. A plurality of holes are disposed on the cowl. Each of the plurality of holes are configured to alter local air pressure about one of the first surface and the second surface of the cowl. The plurality of holes are in communication with the flow volume.

8 Claims, 2 Drawing Sheets

U.S. PATENT DOCUMENTS

| | | | |
|---|---|---|---|
| 3,623,494 A | 11/1971 | Poucher | |
| 3,652,036 A | 3/1972 | Sans et al. | |
| 3,662,556 A | 5/1972 | Poucher et al. | |
| 3,664,612 A | 5/1972 | Skidmore et al. | |
| 3,699,682 A | 10/1972 | Kleckner | |
| 3,736,750 A | 6/1973 | Britt | |
| 3,763,874 A | 10/1973 | Wilde et al. | |
| 3,770,228 A | 11/1973 | Traksel et al. | |
| 3,905,566 A | 9/1975 | Anderson | |
| 4,007,891 A | 2/1977 | Sorensen | |
| 4,012,013 A | 3/1977 | Ball et al. | |
| 4,044,973 A | 8/1977 | Moorehead | |
| 4,083,181 A | 4/1978 | Adamson | |
| 4,132,240 A | 1/1979 | Frantz | |
| 4,147,029 A | 4/1979 | Sargisson | |
| 4,154,256 A * | 5/1979 | Miller | 137/15.1 |
| 4,199,295 A | 4/1980 | Raffy et al. | |
| 4,220,171 A | 9/1980 | Ruehr et al. | |
| 4,475,702 A | 10/1984 | Cole | |
| 4,540,143 A | 9/1985 | Wang | |
| 4,722,357 A | 2/1988 | Wynosky | |
| 4,738,416 A * | 4/1988 | Birbragher | 244/134 B |
| 4,865,268 A | 9/1989 | Tracksdorf | |
| 4,899,958 A | 2/1990 | Horikawa | |
| 4,912,921 A | 4/1990 | Rice et al. | |
| 4,993,663 A | 2/1991 | Lahti et al. | |
| 5,000,399 A | 3/1991 | Readnour et al. | |
| 5,012,639 A | 5/1991 | Ream et al. | |
| 5,014,933 A | 5/1991 | Harm et al. | |
| 5,058,617 A | 10/1991 | Stockman et al. | |
| 5,127,222 A | 7/1992 | Ream et al. | |
| 5,141,182 A | 8/1992 | Coffinberry | |
| 5,143,329 A | 9/1992 | Coffinberry | |
| 5,145,126 A | 9/1992 | Patilla | |
| 5,156,362 A | 10/1992 | Leon | |
| 5,177,957 A | 1/1993 | Grieb | |
| 5,261,227 A | 11/1993 | Giffin, III | |
| 5,284,012 A | 2/1994 | Laborie et al. | |
| 5,297,765 A | 3/1994 | Hughes et al. | |
| 5,351,476 A | 10/1994 | Laborie et al. | |
| 5,357,742 A * | 10/1994 | Miller | 60/785 |
| 5,361,828 A | 11/1994 | Lee | |
| 5,447,283 A | 9/1995 | Tindell | |
| 5,568,724 A | 10/1996 | Lindner et al. | |
| 5,586,431 A | 12/1996 | Thonebe et al. | |
| 5,593,112 A | 1/1997 | Maier et al. | |
| 5,725,182 A | 3/1998 | Valleroy | |
| 5,727,380 A | 3/1998 | Lardy et al. | |
| 5,732,547 A | 3/1998 | Olsen et al. | |
| 5,743,488 A | 4/1998 | Rolston et al. | |
| 5,803,410 A * | 9/1998 | Hwang | 244/208 |
| 5,813,625 A * | 9/1998 | Hassan et al. | 244/17.11 |
| 5,841,079 A * | 11/1998 | Parente | 181/214 |
| 5,934,611 A * | 8/1999 | Tindell et al. | 244/53 B |
| 5,971,328 A | 10/1999 | Kota | |
| 5,987,880 A | 11/1999 | Culbertson | |
| 6,055,805 A | 5/2000 | El-Aini et al. | |
| 6,089,505 A | 7/2000 | Gruensfelder et al. | |
| 6,109,566 A | 8/2000 | Miller et al. | |
| 6,129,309 A | 10/2000 | Smith et al. | |
| 6,129,311 A | 10/2000 | Welch et al. | |
| 6,170,253 B1 | 1/2001 | Newton | |
| 6,179,251 B1 | 1/2001 | Tindell et al. | |
| 6,231,006 B1 | 5/2001 | Gruensfelder et al. | |
| 6,259,976 B1 | 7/2001 | Lemelson et al. | |
| 6,260,567 B1 | 7/2001 | Gruensfelder et al. | |
| 6,334,753 B1 | 1/2002 | Tillman et al. | |
| 6,340,135 B1 | 1/2002 | Barton | |
| 6,360,989 B1 | 3/2002 | Maguire | |
| 6,375,118 B1 | 4/2002 | Kibens et al. | |
| 6,379,110 B1 | 4/2002 | McCormick et al. | |
| 6,390,418 B1 | 5/2002 | McCormick et al. | |
| 6,471,477 B2 * | 10/2002 | Hassan et al. | 416/90 A |
| 6,651,929 B2 | 11/2003 | Dionne | |
| 6,655,632 B1 | 12/2003 | Gupta | |
| 6,698,691 B2 * | 3/2004 | Porte | 244/134 B |
| 6,708,711 B2 | 3/2004 | Surply et al. | |
| 6,763,651 B2 | 7/2004 | Shmilovich et al. | |
| 6,764,043 B2 | 7/2004 | Sankrithi et al. | |
| 6,793,177 B2 * | 9/2004 | Bonutti | 244/78.1 |
| 6,971,229 B2 | 12/2005 | Lair | |
| 7,048,229 B2 | 5/2006 | Sanders et al. | |
| 7,048,230 B2 * | 5/2006 | Meyer | 244/130 |
| 7,090,165 B2 | 8/2006 | Jones et al. | |
| 7,131,612 B2 | 11/2006 | Baptist et al. | |
| 7,165,744 B2 | 1/2007 | Howarth et al. | |
| 7,255,309 B2 * | 8/2007 | Boldrin et al. | 244/208 |
| 7,617,670 B2 | 11/2009 | Truax et al. | |
| 7,735,601 B1 | 6/2010 | Stieger et al. | |
| 7,739,865 B2 | 6/2010 | Prasad et al. | |
| 7,766,280 B2 * | 8/2010 | Cloft et al. | 244/208 |
| 7,802,760 B2 | 9/2010 | Webster | |
| 7,870,721 B2 | 1/2011 | Winter et al. | |
| 2004/0237534 A1 | 12/2004 | Webster et al. | |
| 2005/0060982 A1 | 3/2005 | Mani et al. | |
| 2005/0274103 A1 | 12/2005 | Prasad et al. | |
| 2006/0155432 A1 | 7/2006 | Brown | |
| 2007/0221788 A1 * | 9/2007 | Meister | 244/208 |
| 2008/0092548 A1 | 4/2008 | Morford et al. | |
| 2008/0112799 A1 | 5/2008 | Winter et al. | |
| 2008/0267762 A1 | 10/2008 | Jain et al. | |
| 2008/0283676 A1 | 11/2008 | Jain et al. | |
| 2008/0286094 A1 | 11/2008 | Jain | |
| 2009/0003997 A1 | 1/2009 | Jain et al. | |
| 2009/0008508 A1 | 1/2009 | Jain et al. | |
| 2009/0121083 A1 | 5/2009 | Jain | |

FOREIGN PATENT DOCUMENTS

| | | |
|---|---|---|
| EP | 0694740 | 1/1996 |
| EP | 1382379 | 1/2004 |
| FR | 980347 | 5/1951 |
| GB | 1070458 | 6/1967 |
| GB | 1312619 | 4/1973 |
| GB | 1336724 | 11/1973 |
| GB | 1382809 | 2/1975 |

OTHER PUBLICATIONS

U.S. Appl. No. 11/584,030, filed Oct. 20, 2006, Morford, et al., entitled "Gas Turbine Engine Having Slim-Line Nacelle".
U.S. Appl. No. 11/749,260, filed May 16, 2007, Jain, et al.
U.S. Appl. No. 11/739,216, filed Apr. 24, 2007, Jain, et al.
U.S. Appl. No. 11/750,398, filed May 18, 2007, Jain, et al.
U.S. Appl. No. 11/772,287, filed Jul. 2, 2007, Jain, et al.
U.S. Appl. No. 11/769,749, filed Jun. 28, 2007, Jain, et al.
Extended European Search Report for EP Application No. 07254305 dated Aug. 19, 2011.
Extended European Search Report for EP Application No. 08251047 dated Sep. 6, 2011.
Extended European Search Report for EP Application No. 08252263 dated Aug. 19, 2011.
Extended European Search Report for EP Application No. 08252429 dated Nov. 26, 2008.
Extended European Search Report for Application No. EP 08 25 3874.5 dated Jan. 25, 2012.

* cited by examiner

NACELLE FLOW ASSEMBLY

RELATED APPLICATION

This application is a divisional application of U.S. patent application Ser. No. 11/938,975 entitled "Nacelle Flow Assembly," which was filed on Nov. 13, 2007.

BACKGROUND OF THE INVENTION

This invention relates to a nacelle assembly for a gas turbine engine, particularly for an aircraft.

For a gas turbine engine, such as a turbo fan engine, air is pressurized in a compressor and mixed with fuel in a combustor to generate hot combustion gases. These gases flow downstream through the turbine stages of the engine, which extract energy from the gases. In a two spool gas turbine engine, a high pressure turbine powers a high pressure compressor, while a low pressure turbine powers the fan section disposed upstream of the compressor and a low pressure compressor.

Combustion gases are discharged from the turbo fan engine through a core exhaust nozzle while fan air is discharged through an annular fan exhaust nozzle defined at least partially by a nacelle surrounding the core engine. A majority of the propulsion thrust is provided by the pressurized fan air, which is discharged through the fan exhaust nozzle. The remaining thrust is provided by the combustion gases discharged through the core exhaust nozzle.

It is known in the field of aircraft gas turbine engines that the performance of the turbo fan engine varies during diverse flight conditions experienced by the aircraft. An inlet lip section located at the foremost edge of the turbo fan nacelle is typically designed to enable operation of the turbo fan engine and prevent the separation of airflow from the inlet lip section of the nacelle during these diverse flight conditions. For example, the inlet lip section requires a "thick" inlet lip section designed to support operation of the turbo fan during specific flight conditions, such as cross-wind conditions, take-off and the like. Disadvantageously, the "thick" inlet lip section may reduce the efficiency of the turbo fan engine during cruise conditions of the aircraft, which exist for the large majority of the flight of the aircraft.

A need therefore exists to optimize the performance of a turbo fan gas turbine engine during diverse flight conditions so as to reduce the nacelle thickness and its associated drag.

SUMMARY OF THE INVENTION

A nacelle assembly for a turbine engine has a cowl for a turbine engine. The cowl has a first surface spaced from a second surface. The second surface defines defining a bypass flow passage. A flow volume is spaced between the first surface and the second surface. A plurality of holes are disposed on the cowl. Each of the plurality of holes are configured to alter local air pressure about one or both of the first surface and the second surface of the cowl. The plurality of holes are in communication with the flow volume.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
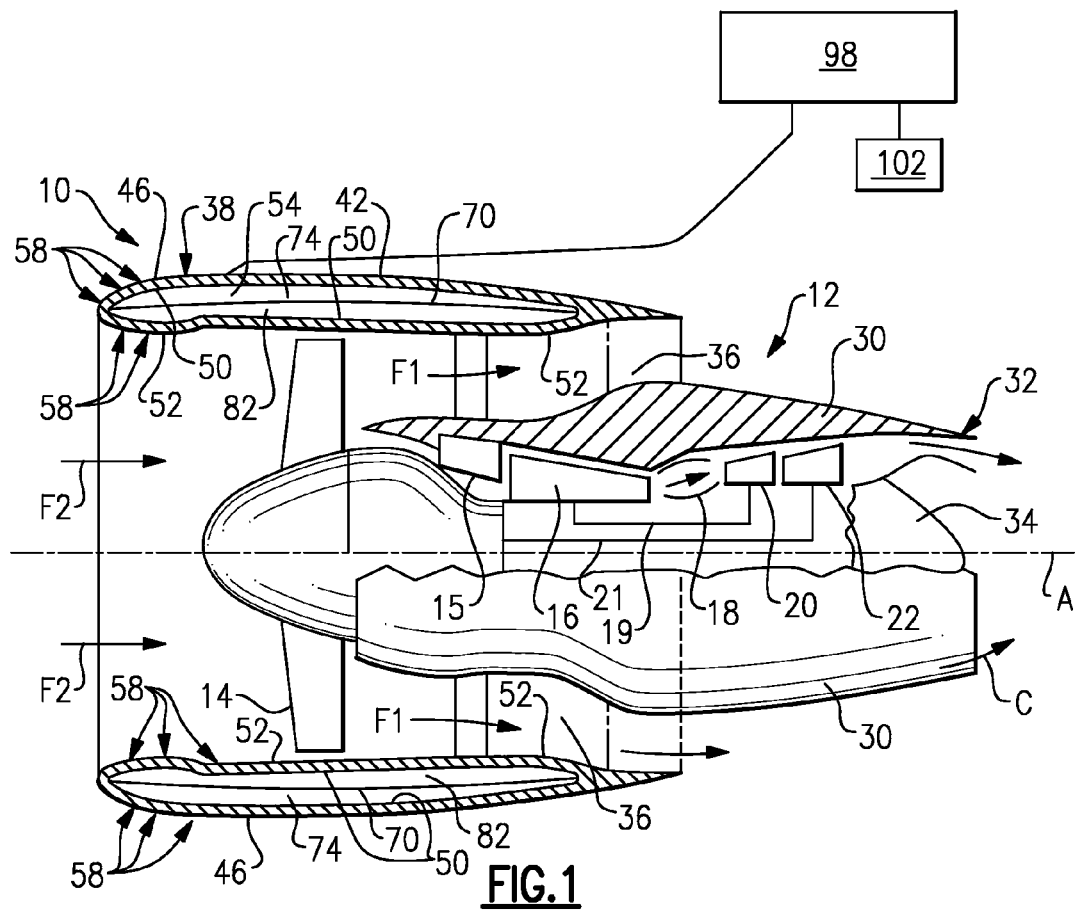
FIG. 1 illustrates a side cross-sectional view of a gas turbine engine, including the present nacelle.

FIG. 1 illustrates a gas turbine engine assembly 10, which includes "in serial flow communication" fan section 14, low pressure compressor 15, high pressure compressor 16, combustor 18, high pressure turbine 20, and low pressure turbine 22. During operation, air is pressurized in the compressors 15, 16 and mixed with fuel in the combustor 18 to generate hot combustion gases. The hot combustion gases flow through high and low pressure turbines 20, 22, which extract energy from the hot combustion gases. The high pressure turbine 20 powers high pressure compressor 16 through high speed shaft 19 while a low pressure turbine 22 powers fan section 14 and low pressure compressor 15 through low speed shaft 21. The invention is not limited to two spool axial gas turbine architecture described and may be used with other architectures, such as a single spool axial design and a three spool axial design.

As shown in FIG. 1, gas turbine engine assembly 10 is in the form of a high bypass ratio turbo fan engine mounted within nacelle assembly 38, in which most of the air pressurized by fan section 14 bypasses turbine engine 12 for the generation of propulsion thrust. Nacelle assembly 38 includes fan cowl 42 and core cowl 30 within fan cowl 42. Fan cowl 42 and core cowl 30 define outer flow surfaces of nacelle assembly 38. Air flow $F_2$ is received by nacelle assembly 38 and passes through fan section 14. Discharge air flow F1 is discharged from fan section 14 through bypass flow passage 36, which is defined by fan cowl 42 and core cowl 30. Core exhaust gases C are discharged from turbine engine 12 through a core exhaust nozzle 32, depicted schematically, defined between core cowl 30 and center plug 34 disposed coaxially therein along a longitudinal centerline axis A of turbine engine assembly 10. As shown, fan cowl 42 extends at least partially around axis A of turbine engine 12 and further extends along it.

Figure 2:
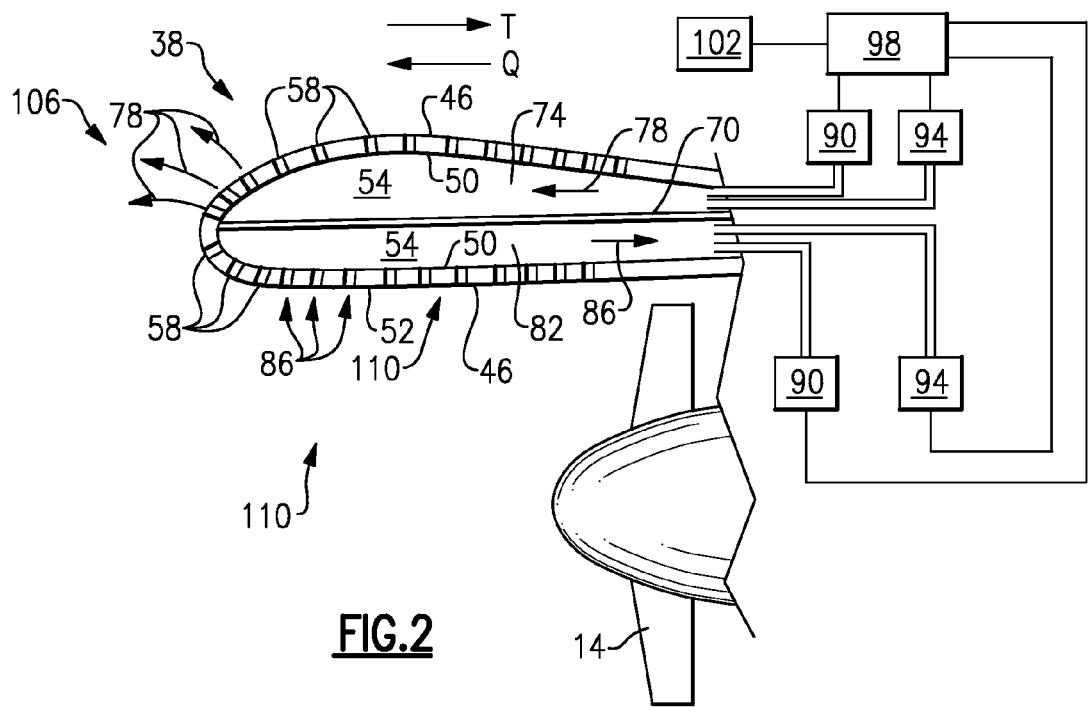
FIG. 2 illustrates a close up view of the nacelle assembly of FIG. 1, highlighting a plurality of holes and a flow volume.

Referring now to both FIG. 1 and FIG. 2, nacelle assembly 38 has first surface 46 and second surface 52 as shown. First surface 46 and second surface 52 define the outer aerodynamic surface of nacelle assembly 38. Second surface 52 further defines bypass flow passage 36. First surface 46 is spaced from second surface 52 to create flow volume 54. Flow volume 54 has interior surface 50, a surface spaced between first surface 46 and second surface 52.

Figure 3:
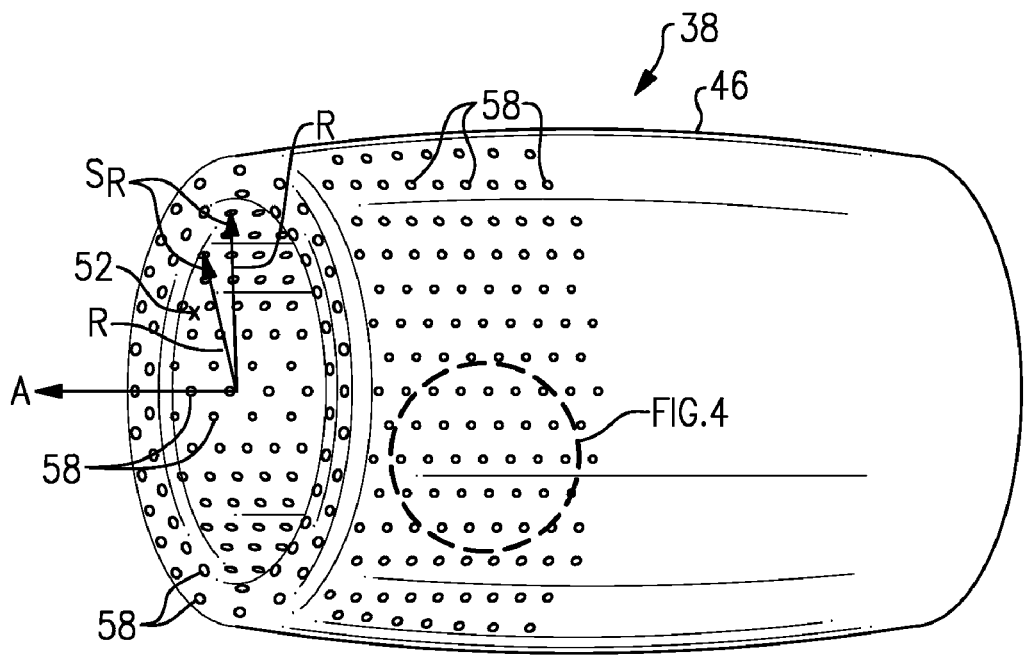
FIG. 3 illustrates a view of the nacelle assembly of FIGS. 1 and 2, showing a plurality of holes on a first surface and a second surface of the assembly.
Figure 4:
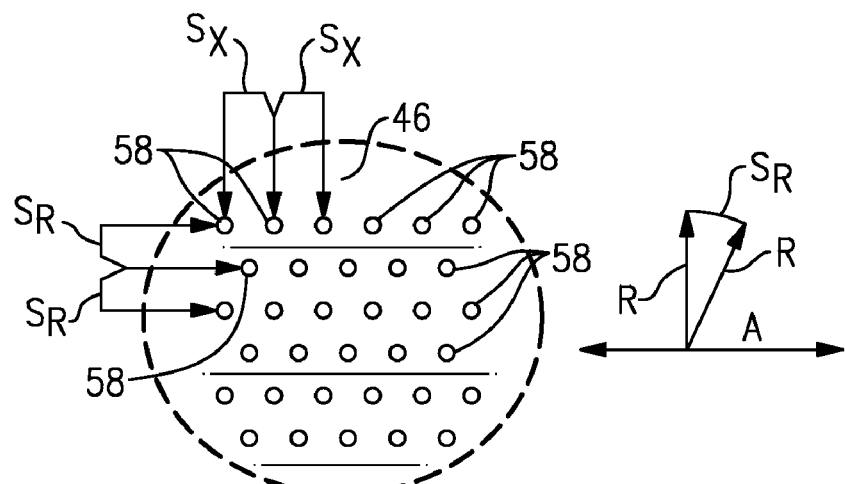
FIG. 4 illustrates a close up view of a pattern of the plurality of holes of FIG. 3.

Extending between flow volume 54 and each of first surface 46 and second surface 52 are holes 58. Each hole 58 is in air flow communication with flow volume 54. In addition, as shown in FIG. 3, plurality of holes 58 extend radially around axis A as well as along axis A of nacelle assembly 38. With reference to FIG. 4, which shows a close-up of first surface 46, each hole 58 is spaced along axis A a distance $S_X$ from its neighboring hole 58. Moreover, each hole 58 is radially spaced a distance $S_R$ from its neighboring radially spaced hole 58. (See also FIG. 3) $S_X$ is between the range of 15 mm to 0.2 mm while $S_R$ is between the range of 15 mm and 0.1 mm. Holes 58 can be any pattern or combination of patterns.

Referring back to FIG. 2, flow volume 54 is divided into first chamber 74 and second chamber 82 by wall 70. Both first chamber 74 and second chamber 82 extend completely around axis A. First chamber 74 is in air flow communication with first device 90 and second device 94. In addition, second chamber 82 is in air flow communication with first device 90 and second device 94. First device 90 is a blowing device that provides first air flow 78 in first direction Q while second device 94 is a suction device that provides second air flow 86 in the direction of second direction arrow T. First chamber 74 may accordingly have first air flow 78 in first direction Q as provided by first device 90. Alternatively, first chamber 74 may have second air flow 86 in the second direction T as provided by second device 94. Likewise, second chamber 84 may have first air flow 78 or, alternatively, second air flow 86. Air flow through first chamber 74 and second chamber 82 are independently and separately controlled by control unit 98, which is in communication with sensor 102.

As will be explained, for a specific operable condition, as sensed by sensor 102, control unit 98 may choose to blow first air flow 78 through first chamber 74 or suck second air flow 86 through this chamber. Separately, control unit 98 may blow first air flow 78 or suck second air flow 86 through second chamber 82. Because of wall 70, air flow in one direction, say first direction Q, will not interfere with air flow in second direction, say second direction T, which is a direction opposite to the direction of arrow Q. Holes 58 permit either first air flow 78 or second air flow 86 to be communicated to first surface 46 and second surface 52. In this way, local air pressure may be increased or decreased around first surface 46 and second surface 52, thereby altering air flow around these surfaces of nacelle assembly 38.

For example, control unit 98 may direct first device 90 to blow first air flow 78 in the direction of arrow Q out holes 58, out first area 106 of first surface 46 while also directing second device 94, which is in air flow communication with second chamber 82, to suck air from second area 110 of second surface 52 and create second air flow 86 in the direction of arrow T. In this way, one area, say first area 106, may have an increase of local air pressure around first surface 46 while another area, say second area 110, may have a decrease in local air pressure. In so doing, greater control over nacelle assembly 38 is established so that turbine engine assembly 10 can be optimized for the appropriate operable condition.

Accordingly, an operable condition of an aircraft is sensed by sensor 102 and communicated to control unit 98. Control unit 98 may then select between increasing local air pressure or decreasing local air pressure at each surface (first surface 46 and second surface 52) independently of the other surface. The operability conditions may be a static takeoff condition, a crosswind condition, a climb condition, a cruise condition, a windmill condition or any other condition. Each of these conditions will dictate a response by control unit 98 to make a selection or no selection at all. In this way, different areas of first surface 46 and second surface 52, such as first area 106 and second area 110, may have different air flow through holes 58 to create different local air pressure conditions, thereby altering the aerodynamic configuration of nacelle assembly 38 without changing its actual physical size.

The foregoing description shall be interpreted as illustrative and not in any limiting sense. A worker of ordinary skill in the art would recognize that certain modifications would come within the scope of this invention. For that reason, the follow claims should be studied to determine the true scope and content of this invention.

I claim:

1. A method of altering air pressure on a surface of a nacelle assembly, the method comprising the steps of:
    sensing an operable condition of an aircraft; and
    passing air between a selected one of a plurality of interior nacelle volumes and a nacelle exterior region via holes connecting the selected interior nacelle volume and the nacelle exterior region in response to the sensed operable condition to alter an air pressure at the nacelle exterior region, wherein the holes are arranged to selectively pass air out of the selected one of the plurality of interior nacelle volumes to the nacelle exterior region and selectively reverse air into the selected one of the plurality of interior nacelle volumes from the nacelle exterior region.

2. The method of claim 1 wherein the operable condition comprises at least one of a static takeoff condition, a climb condition, a cruise condition, and a windmill condition.

3. The method of claim 1 including the steps of:
    passing air from a first interior volume of the nacelle to a first exterior area of the nacelle via first holes of the holes in the nacelle to increase local air pressure at the first exterior area of the nacelle; and
    passing air from a second exterior area different from the first exterior area of the nacelle to a second interior volume of the nacelle via second holes of the holes in the nacelle to decrease local air pressure at the second exterior area of the nacelle.

4. The method of claim 3, wherein the first interior volume is radially outwards of the second interior volume and separated by wall.

5. The method of claim 1, wherein the plurality of holes are uniformly radially spaced apart and uniformly axially spaced apart.

6. The method of claim 1 including the step of:
    (d) passing air from a first interior volume of the nacelle to a first exterior area of the nacelle via first holes of the plurality of holes in the nacelle to increase local air pressure at the first exterior area of the nacelle without passing air from a second interior volume of the nacelle to a second exterior area of the nacelle.

7. A method of altering air pressure on a surface of a nacelle assembly, the method comprising the steps of:
    (a) sensing an operable condition of an aircraft;
    (b) selecting between increasing local air pressure and decreasing local air pressure at the nacelle surface of the nacelle assembly through a plurality of holes on said nacelle surface based on the sensed operable condition; and
    (c) increasing air flow at a first area of the nacelle surface and decreasing airflow at a second area of the nacelle surface, the first area different from the second area, wherein the first area is radially outwards of the second area;
    (d) passing air from a first interior volume of the nacelle to a first exterior area of the nacelle via first holes of the plurality of holes in the nacelle to increase local air pressure at the first exterior area of the nacelle; and
    (e) passing air from a second exterior area different from the first exterior area of the nacelle to a second interior volume of the nacelle via second holes of the plurality of holes in the nacelle to decrease local air pressure at the second exterior area of the nacelle, wherein the first interior volume is independently controlled relative to the second interior volume.

8. A method of altering air pressure on a surface of a nacelle assembly, the method comprising the steps of:
    (a) sensing an operable condition of an aircraft;
    (b) selecting between increasing local air pressure and decreasing local air pressure at the nacelle surface of the nacelle assembly through a plurality of holes on said nacelle surface based on the sensed operable condition;

(c) increasing air flow at a first area of the nacelle surface and decreasing airflow at a second area of the nacelle surface, the first area different from the second area, wherein the first area is radially outwards of the second area;

(d) passing air from a first interior volume of the nacelle to a first exterior area of the nacelle via first holes of the plurality of holes in the nacelle to increase local air pressure at the first exterior area of the nacelle; and (e) passing air from a second exterior area different from the first exterior area of the nacelle to a second interior volume of the nacelle via second holes of the plurality of holes in the nacelle to decrease local air pressure at the second exterior area of the nacelle, wherein airflow moves axially forward in the first interior volume and axially aft in the second interior volume.

* * * * *